United States Patent [19]

Bodine et al.

[11] Patent Number: 4,646,239
[45] Date of Patent: Feb. 24, 1987

[54] METHOD OF SEISMIC EXPLORATION INCLUDING PROCESSING AND DISPLAYING SEISMIC DATA TO QUANTITATIVELY DISTINGUISH AMONG SEISMIC EVENTS

[75] Inventors: John H. Bodine; Jonathan Bork, both of Tulsa; Richard M. Alford, Broken Arrow; James H. Wright; Leon A. Thomsen, both of Tulsa, all of Okla.

[73] Assignee: Standard Oil Company, Chicago, Ill.

[21] Appl. No.: 632,780

[22] Filed: Jul. 20, 1984

[51] Int. Cl.$^4$ .......................... G01V 1/34; G01V 1/36
[52] U.S. Cl. ...................................... 364/421; 367/38; 367/47; 367/70
[58] Field of Search .................... 364/421; 367/38, 47, 367/62, 70, 68

[56] References Cited

U.S. PATENT DOCUMENTS

| | | | |
|---|---|---|---|
| 3,899,768 | 8/1975 | Quay et al. | 367/68 |
| 4,316,267 | 2/1982 | Ostrander | 367/68 |
| 4,316,268 | 2/1982 | Ostrander | 367/68 |
| 4,375,090 | 2/1983 | Thompson et al. | 367/73 |
| 4,437,176 | 3/1984 | Mack | 367/38 |
| 4,467,461 | 8/1984 | Rice | 367/70 X |
| 4,534,019 | 8/1985 | Wiggins et al. | 367/75 |
| 4,554,649 | 11/1985 | Herkenhoff et al. | 367/68 |
| 4,570,246 | 2/1986 | Herkenhoff et al. | 367/68 |

OTHER PUBLICATIONS

Aki, K. et al., *Quantitative Seismology Theory and Method*, (Freeman and Company: San Francisco), 1980, 153–154.

*Primary Examiner*—Jerry Smith
*Assistant Examiner*—Clark A. Jablon
*Attorney, Agent, or Firm*—Timothy D. Stanley

[57] ABSTRACT

A method for quantitatively distinguishing seismic events on a seismic record for inferring changes in the geological character of the subterranean formations. Reflection coefficients are obtained for such seismic events and a first set of attributes indicative of amplitude variations in the offset seismic signals corresponding to the seismic event as a function of incident angle are obtained therefrom. The first set of attributes provide a seismologist with a diagnostic tool for quantitatively evaluating subtle changes in the seismic event. A second set of attributes which are functions of the first set of attributes provide the seismologist with additional diagnostic tools for evaluating subtle changes in the seismic events.

31 Claims, 20 Drawing Figures

FIELD DATA

METHOD OF SEISMIC EXPLORATION INCLUDING PROCESSING AND DISPLAYING SEISMIC DATA TO QUANTITATIVELY DISTINGUISH AMONG SEISMIC EVENTS

BACKGROUND OF THE INVENTION

The present invention relates generally to a novel method of seismic exploration, and more particularly, to a method for quantitatively distinguishing among seismic events and for inferring changes in the geological character of the subterranean formation. Seismic data including a plurality of seismic signals or "traces" are acquired with sets of seismic sources and seismic receivers. A measure of the reflection coefficient is obtained for selected seismic events within the seismic data. Attributes quantitatively descriptive of variations in the seismic signal amplitude, as a function of incident angle, are developed from the reflection coefficients for selected seismic events. Predetermined combinations of such attributes can provide the geophysicist with an extremely accurate diagnostic tool for quantitatively distinguishing among seismic events and for inferring changes in the subterranean formation.

In the continuing search for hydrocarbons contained in the earth's subterranean formations, exploration geophysicists have developed numerous techniques for imparting seismic wave energy into the earth's subterranean formations, recording the returning reflected seismic waves and processing the recorded seismic data to produce seismic signals or traces. Such seismic signals or traces contain a multiplicity of information, e.g., frequency, amplitude, phase, etc., which have been related to formation structure, lithology, or pore fluid content. More recently, geophysicists' interests have turned to visually evaluating high intensity seismic events in the seismic signals or traces, and variations in the seismic signal amplitude as a function of range. Exemplary of such focus are Quay, et al., U.S. Pat. No. 3,899,768; Thompson, et al., U.S. Pat. No. 4,375,090 and Ostrander, U.S. Pat. Nos. 4,316,267 and 4,316,268.

In particular, Ostrander indicates that progressive change in the seismic signal amplitude of a high intensity seismic event, as a function of range, is more likely than not an indicator of the presence of a gas-bearing formation. Specifically, progressive seismic signal amplitude changes, in an increasing or decreasing manner, with increasing range is the criterion for identifying gas-bearing formations. Ostrander also discloses a method for seismic signal enhancement to improve the visual resolution of such progressive changes in seismic signal amplitude as a function of range.

Quay recognizes that lateral variations in the seismic data can be attributed to variations of the lithological character of the subterranean formations. Quay obtained such results by extracting selected seismic parameters from a seismic wave and thereafter visually displaying such seismic parameters upon a seismic trace of such seismic wave. The visual correlation of anomalies in such seismic parameters relative to the structural interpretation based upon the seismic traces yields a scheme for visually interpreting seismic record sections.

Thompson discloses that acoustic characteristics associated with hydrocarbon containing formations can be compared with similar synthetic values.

Although evaluation of bright spots has been used as an indicator of gas-bearing formations, such analysis is still a calculated risk, as evidenced by the significant numbers of such bright spots which are nonproductive when actually drilled.

SUMMARY OF THE INVENTION

In accordance with the present invention, a novel method of seismic exploration is disclosed including means for processing and displaying seismic data for quantitatively distinguishing among seismic events and for inferring changes in the geological character of the subterranean formation. More particularly, seismic data including a plurality of seismic signals or traces are generated with sets of seismic receivers and seismic sources. A measure of the reflection coefficient is obtained for selected seismic events within the seismic data and a first set of attributes, descriptive of variations in the seismic signal amplitude as a function of incident angle for the selected seismic events, are generated. A second set of attributes are generated as a function of selected combinations of the first set of attributes. The first and second sets of attributes can provide an extremely accurate diagnostic tool for quantitatively distinguishing among seismic events and for inferring changes in the geological character of selected combinations of the subterranean formation.

Further, displays of the first and second sets of attributes can be overlayed on a corresponding seismic section of seismic signals. Color-vector plots of the attributes can also be employed to highlight subtle changes in the amplitude of the seismic signal or trace as function of incident angle. These subtle changes are useful for inferring changes in geology, geological character, lithological contrast and pore fluid content.

Additionally, the present invention provides a novel method for aligning and obtaining a measure of the seismic signal amplitude for seismic events in incident angle ordered gathers of offset seismic signals or traces. A reference seismic signal is formed from the incident angle ordered gathers of the offset seismic signals. A segment of the reference seismic signal containing the the selected seismic event is cross-correlated with each corresponding offset seismic signal or trace and the position of maximum cross-correlation on each offset seismic signal or trace being a primary offset event position. A measure of the seismic signal amplitude can be obtained by averaging the lobe amplitude of each seismic signal or trace within a prescribed time window of the primary offset event position.

DETAILED DESCRIPTION OF THE PREFERRED EMBODIMENT

The present invention discloses a novel method for processing and displaying seismic data for quantitatively distinguishing among seismic events and for inferring changes in the geological character of the subterranean formation.

In order to facilitate a clear understanding of the present invention, a brief description of certain basic principles of the reflection and transmission of seismic wave energy in the earth's subterranean formation are provided. It is understood by those skilled in the art that seismic prospecting depends upon changes in the compressional impedance within the earth's subterranean formations. A change in compressional impedance from one formation to another causes the seismic wave energy to be reflected at the interface of the two formations. Irrespective of other differences in the two formations, if the two formations do not differ in compressional impedance, the seismic wave energy will take no notice of the interface. Thus, compressional impedance is a most important property. Compressional impedance is defined as the product of the formation density and the formation compressional wave velocity.

Figure 1:
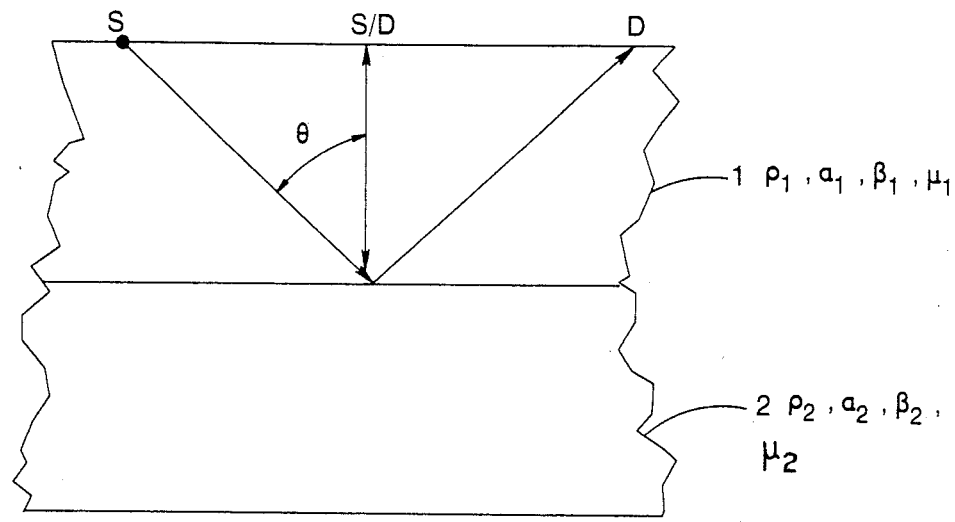
FIG. 1 is a schematic representation of normal and non-normal incident seismic waves impinging upon a subterranean formation interface.

Through the generation of seismic signals or traces, estimates of the normal incidence reflection coefficients $R_c(0°)$ can be obtained which provide a measure of the change in compressional impedance according to:

$$R_c(0°) = A_r/A_i = \frac{\rho_2 \alpha_2 - \rho_1 \alpha_1}{\rho_1 \alpha_1 + \rho_2 \alpha_2} \quad (1)$$

where $A_r$ is the amplitude of a reflected seismic wave and $A_i$ is the amplitude of a normally incident seismic wave. As shown in FIG. 1, seismic energy is imparted and detected at S/D; $\alpha_1$ is the compressional wave velocity in the overlying formation 1; $\alpha_2$ is the compressional wave velocity in the underlying formation 2; $\rho_1$ is the density of the overlying formation 1; and $\rho_2$ is the density of the underlying formation 2.

However, the reflection coefficient $R_c(\theta)$ for non-normal incidence seismic wave depends upon other factors including the shear wave velocities in the adjacent formations. An approximation of the exact plane wave solution for the reflection coefficient $R_c(\theta)$ at any angle of incidence $\theta$ has been developed. (K. Aki and P. G. Richards, "Quantitative Seismology Theory and Method," Freeman and Co. San Francisco, 1980, pgs. 153–154.)

The approximation can be reformulated as:

$$R_c(\theta) = \left[\frac{\Delta Z}{2Z}\right] + \left[\frac{\Delta \alpha}{2\alpha} - \frac{2\beta^2 \Delta \mu}{\alpha^2 \mu}\right] \tan^2\theta + \left[\frac{2\beta^2 \Delta \mu}{\alpha^2 \mu}\right] \tan^2\theta \sin^2\theta \quad (2)$$

where Z is the average compressional impedance of formations 1 and 2, $\alpha$ is the average compressional wave velocity of formations 1 and 2, $\beta$ is the average shear wave velocity of formations 1 and 2; $\mu$ is the average shear modulus of formations 1 and 2, and $\Delta Z$, $\Delta \alpha$, and $\Delta \beta$ indicate a change in the given property between the adjacent formations 1 and 2, e.g., $\Delta Z = (Z_2 - Z_1)$.

Figure 2:
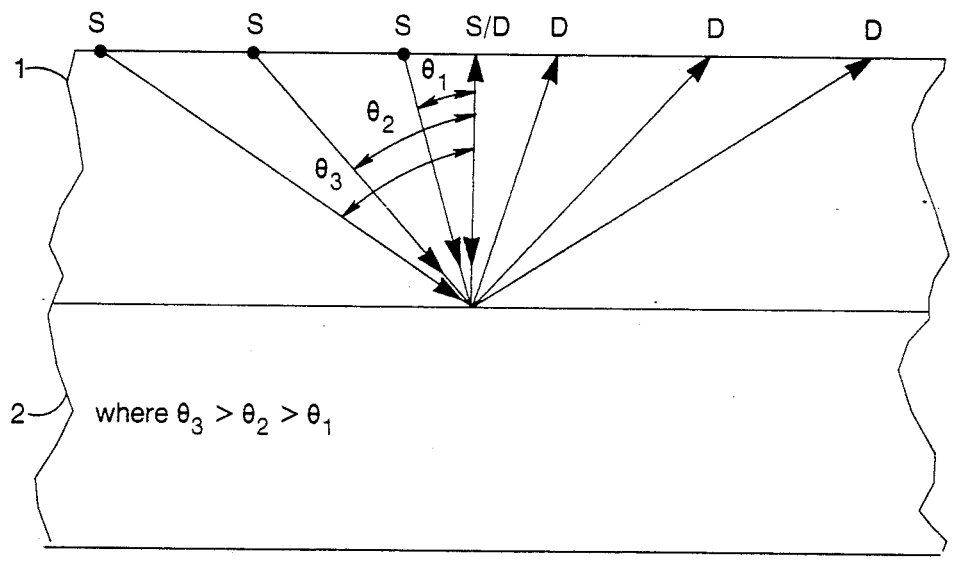
FIG. 2 is a schematic of a common depth gather of seismic signals.

Each offset seismic signal or trace of an unstacked common depth point (CDP) gather of seismic signals or traces has a different incident angle $\theta$ for a given formation interface as seen in FIG. 2. In particular, seismic wave energy is imparted by seismic sources S and detected by seismic detectors D. For a selected seismic event, such CDP gathers of seismic signals can be used to obtain a least squares solution for the quantities shown in brackets of Equation (2).

Figure 3:
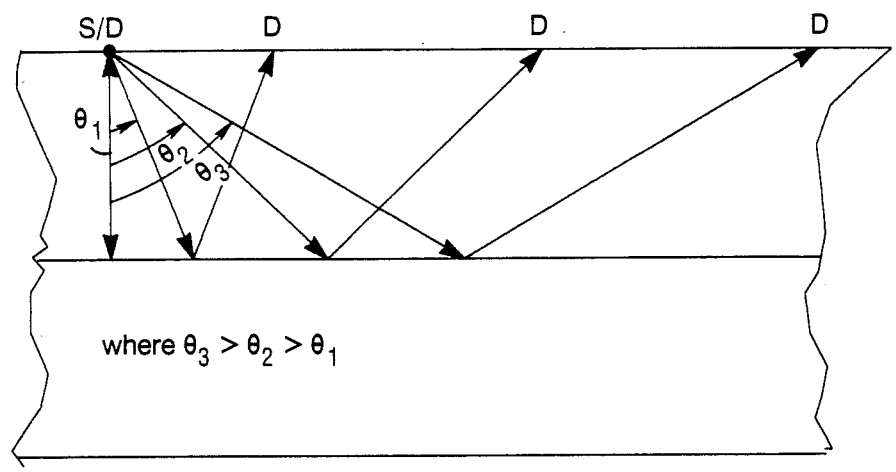
FIG. 3 is a schematic of a common source point gather of seismic signals.

Sorting offset seismic signals or traces into CDP gathers is merely exemplary since other sorting techniques can be employed which sequence the offset seismic signals in order of increasing (or decreasing) incident angle $\theta$, such as common source point shown in FIG. 3. A third example would be the set of plane wave responses, e.g., the result of slant stacking the seismic data, normally indexed in terms of the ray parameter p and intercept time t. All such seismic data sets, containing seismic reflection data with variable incident angle $\theta$, can be regarded as simple modifications to the invention herein using CDP seismic data as exemplar.

Equation (2) can also be represented as:

$$R_c(\theta) = B_0 + B_1 \tan^2\theta + B_2 \tan^2\theta \sin^2\theta \quad (3)$$

where $$B_0 = \left[\frac{\Delta Z}{2Z}\right] \quad B_1 = \left[\frac{\Delta \alpha}{2\alpha} - \frac{2\beta^2 \Delta \mu}{\alpha^2 \mu}\right] \quad B_2 = \left[\frac{2\beta^2 \Delta \mu}{\alpha^2 \mu}\right]$$

It will be appreciated by those skilled in the art that the attribute $B_0$ is an estimate of the value of the reflection coefficient $R_c$ (0°) for normal incidence compressional wave energy as shown in Equation (1). As such, $B_0$ is strictly related to a measure of the compressional impedance change between adjacent formations. By contrast, the attributes $B_1$ and $B_2$ are related to changes in a compressional wave velocity, shear wave velocity and formation density. The attributes $B_0$, $B_1$ and $B_2$ thus comprise a first set of attributes descriptive of amplitude variations in the seismic signals or traces as a function of the incident angle.

The dip and depth of a given subterranean formation, the interval velocity as a function of depth, and the largest offset between the seismic sources and the seismic receivers in the seismic survey determine the maximum incident angle $\theta$ or aperture for the reflected acoustic waves. If the incident angle $\theta$ is usually constrained to angles approximately no more than 35°, the attribute $B_2$ can be disregarded.

Figure 4:
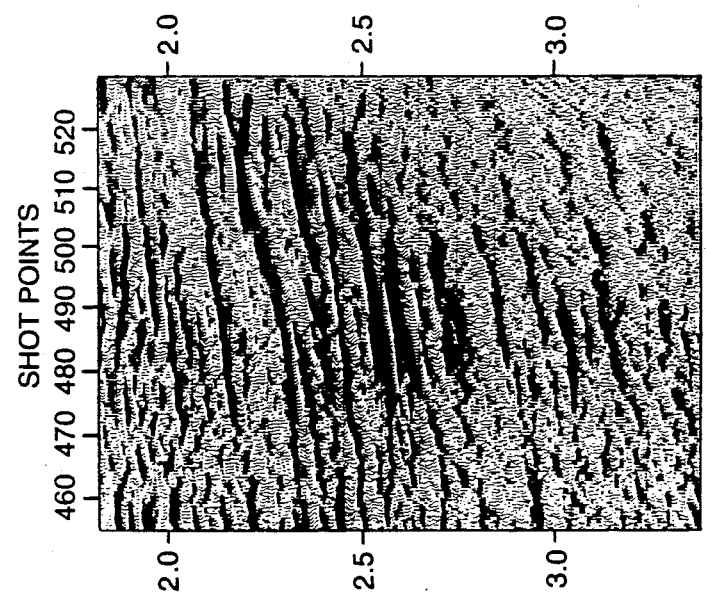
FIG. 4 is a common depth point seismic section of seismic signals or traces.
Figure 5:
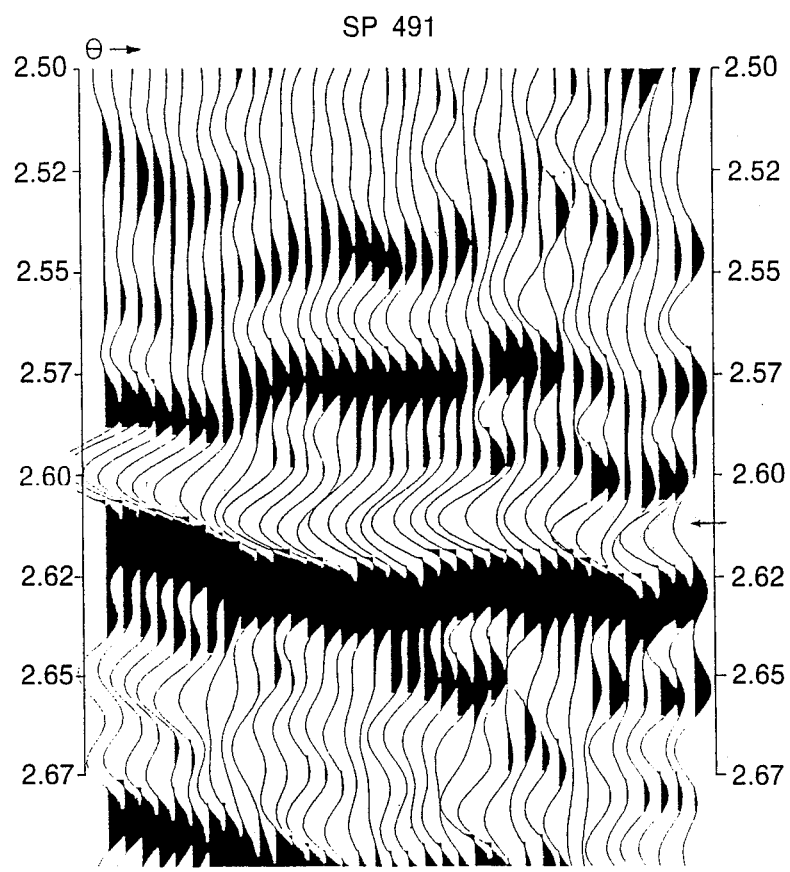
FIG. 5 is an unstacked CDP gather of offset seismic signals or traces at SP 491 of FIG. 4.

Looking now to FIG. 4, a CDP seismic section of seismic signals or traces of field data is shown which includes a bright spot at approximately 2.6 secs. FIG. 5 is an unstacked CDP gather of offset seismic signals or traces at SP 491 of FIG. 4. Attention is drawn to the seismic event at 2.6 seconds of FIG. 5 which is generally indicated by the arrows.

In a process to be described later, alignment of the seismic event is improved by cross correlating a segment of each of the offset seismic signals or traces with a segment of a reference seismic signal. The reference seismic signal comprises a CDP stack of the offset seismic signals or traces. An improved measure of the amplitude of each offset seismic signal is then obtained as a function of the incident angle.

That high intensity seismic events or bright spots exist within seismic data and can be important in geophysical exploration has been recognized; however, quantification of the subtle variations in the seismic signal or trace amplitude as a function of the incident angle has not been previously attainable. Heretofore, accurate measurements of the variations of the seismic signal or trace amplitude as a function of incident angle has been impeded because such variations are small when compared to the magnitude of the seismic signal or trace amplitude. As such, the incident angle dependent amplitude variations can easily be lost in the background noise level. Others, such as Ostrander, U.S. Pat. No. 4,316,267, and Ostrander, U.S. Pat. No. 4,316,268, have attempted to overcome this problem by summing offset gathers of seismic signals or traces.

After obtaining an improved measure of the incident angle-dependent amplitude variations in the offset seismic signal or trace, a measure of the reflection coefficient $R_c(\theta)$ for a selected seismic event can be obtained by performing an optimized statistical fit of the incident angle dependent amplitude variations in each offset seismic signal or trace to Equation (3). Equations (2) and (3) are merely by way of example since other parametric equations can be developed to obtain a statistical fit thereto, having a new set of attributes related to different formation properties. Attributes quantitatively descriptive of the variations in the seismic signal or trace amplitude as a function of incident angle are obtained from the measure of the reflection coefficient $R_c(\theta)$ and provide a novel diagnostic tool for quantitatively distinguishing among seismic events and for inferring changes in the geological character of the subterranean formation.

EXAMPLE 1

Figure 6:
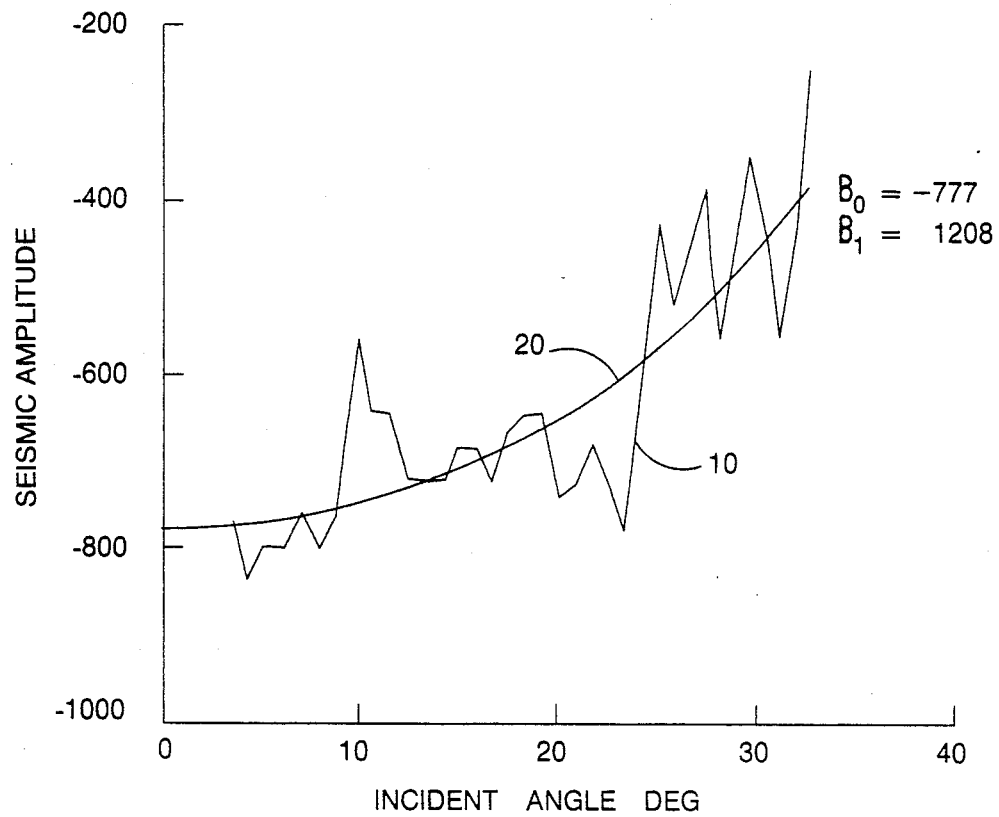
FIG. 6 is a plot of the variation of the offset seismic signal or trace amplitudes as a function of incident angle and least squares fit thereto for the selected seismic event of FIG. 5.

By way of preliminary example, the offset seismic signal or trace amplitudes associated with the seismic event shown in FIG. 5 at 2.6 seconds can be aligned and an improved measure of the seismic signal or trace amplitude can be obtained in a manner to be discussed. A solution to Equation (3) can be obtained by performing a least squares fit of the measure of the offset seismic signal or trace amplitudes as a function of incident angle. Specifically, curve 10 of FIG. 6 is a plot of the measured values of the offset seismic signal or trace amplitudes as a function of incident angle and curve 20 is a least squares fit thereto using Equation (3). Since the maximum incident angle $\theta$ for this example is 32°, only the attributes $B_0$ and $B_1$ are used. The values of the attributes $B_0$ and $B_1$ thus derived are also shown. As will be described later, the attributes $B_0$, $B_1$ and $B_2$ can provide a quantitative measure for distinguishing among seismic events and for inferring changes in the geological character of the subterranean formation.

ALIGNING AND MEASURING

An important aspect of the present invention resides in a method for aligning and measuring the offset seismic signal or trace amplitudes across unstacked gathers of the offset seismic signals or traces as a function of incident angle. Since variations in the offset seismic signal or trace amplitude as a function of the incident angle can easily be lost in the noise level, the seismic data are first processed to balance the frequency content of the near range and the far range offset seismic signals or traces. The seismic data is then corrected for surface and residual statics; corrected for true relative amplitude muted to remove first break energy; corrected for normal moveout; bandpass filtered for optimum signal to noise ratio; and sorted into unstacked ordered incident angle gathers of the offset seismic signals or traces such as the unstacked CDP gather of seismic signals or traces shown in FIG. 5.

Figure 7:
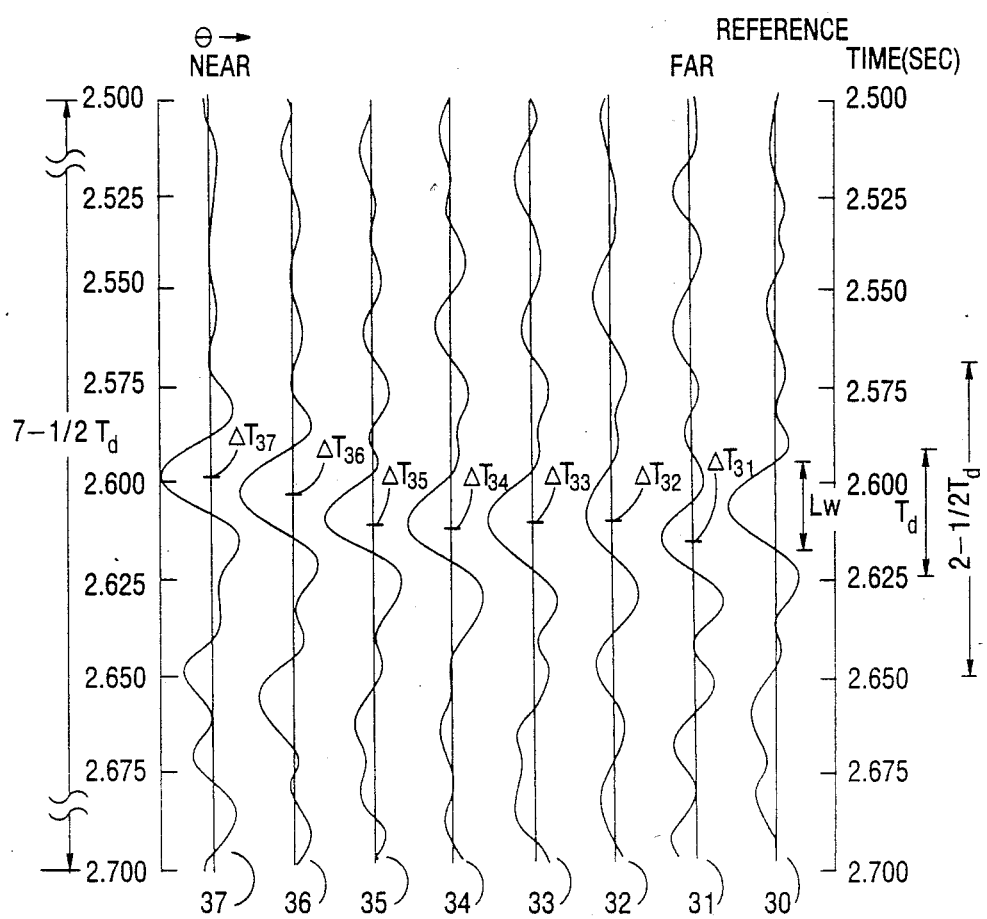
FIG. 7 is a schematic plot of a time-windowed portion of a reference seismic signal or trace and its corresponding unstacked CDP gather of offset seismic signals or traces.

Looking now to FIG. 7, a schematic plot of a time segment of a reference seismic signal or trace 30 formed from a CDP stack of the offset seismic signals or traces 31–37, and its corresponding CDP gather of offset seismic signals or traces 31–37 are shown. A time window $T_d$ is centered about a selected seismic event of the reference seismic signal or trace 30 at approximately 2.6 secs. As seen in FIGS. 5 and 7, the corresponding seismic events across the unstacked CDP gather of offset seismic signals or traces 31–37 are generally not aligned.

A first step of determining the incident angle dependent amplitude variations in the lobe of the offset seismic signals or traces 31–37 corresponding to the selected seismic event of the reference seismic signal or trace 30, is to improve the alignment of the selected seismic event across the unstacked CDP gather of offset seismic signals or traces 31–37. Alignment facilitates measuring the amplitude of each offset seismic signal or trace 31–37 on a lobe-by-lobe basis. As used herein, the lobe of a seismic signal or trace corresponding to the seismic event is defined to be that portion of the seismic signal or trace between two zero amplitude crossings. As seen on the reference seismic signal or trace 30, the seismic event lobe of interest has a lobe width of $L_w$.

Although this example employs a CDP gather of seismic data, any collection of seismic data which sequences the offset seismic signals or traces in order of increasing (or decreasing) incident angle $\theta$ can be utilized. Aligning the seismic event across the unstacked CDP gather of offset seismic signals or traces 31-37 is achieved by individually cross correlating a time segment of the reference seismic signal or trace 30 with a time segment of each of the offset seismic signals or traces 31-37 in FIG. 7. The time position of the maximum cross correlation of each offset seismic signal or trace 31-37 is established within the time window $T_d$. The time window $T_d$ is centered on the lobe peak of the reference seismic signal or trace 30 for the selected seismic event (where $T_d$, the dominant period of the lobe, is determined from the dominant frequency, $F_d = 1/T_d$ as specified by the user). This time position of maximum cross correlation is designated the offset primary event position e.g., $\Delta T_{31}$, $\Delta T_{32}$ ... $\Delta T_{37}$ for each offset seismic signal or trace 31-37 and a measure of the amplitude of the lobe of each offset seismic signal or trace 31-37 is obtained for such position.

The preferred segment length of the reference seismic signal or trace 30 which is cross correlated with each offset seismic signal or trace 31-37 is $2\frac{1}{2}T_d$. The preferred segment length of each offset seismic signal or trace 31-37 which is employed for cross correlation is $7\frac{1}{2}T_d$. Both the offset seismic signal or trace segment length, i.e., $7\frac{1}{2}T_d$, and the reference seismic signal segment length, i.e., $2\frac{1}{2}T_d$, are centered on the lobe peak for the selected seismic event on reference seismic signal or trace 30.

Figure 8:
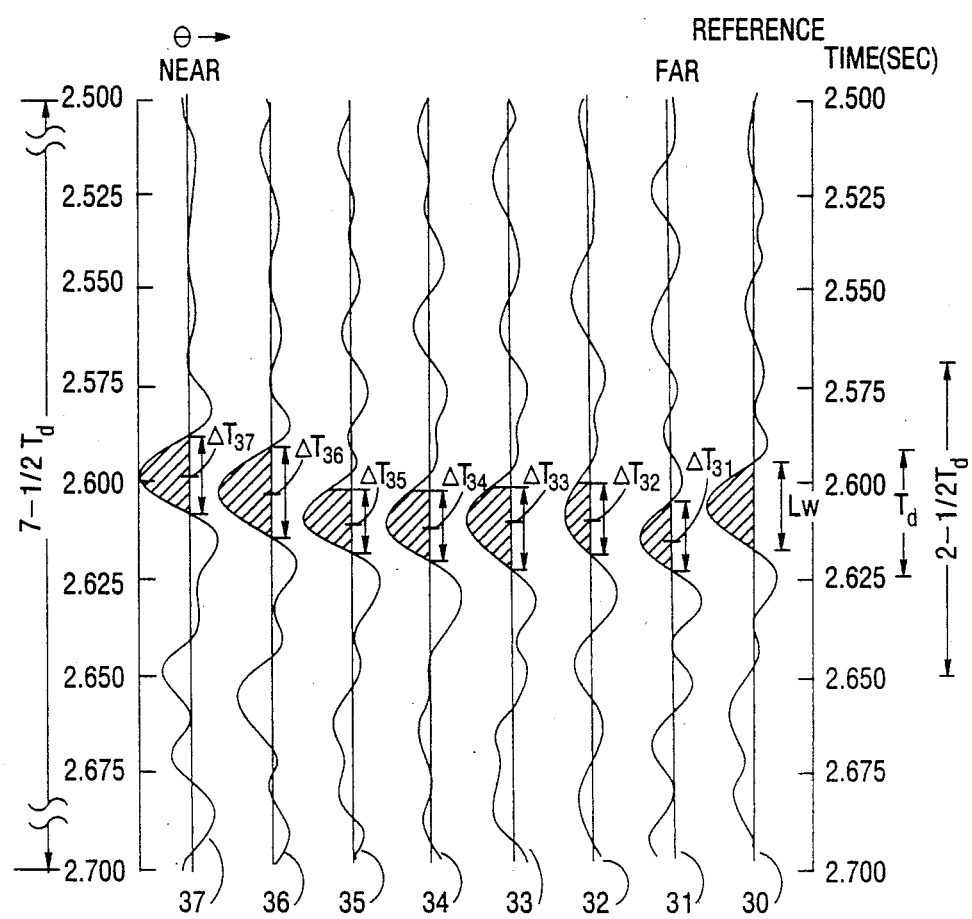
FIG. 8 is a schematic plot demonstrating the method of the present invention for obtaining a measure of the lobe amplitudes for each offset seismic signal or trace.
Figure 9:
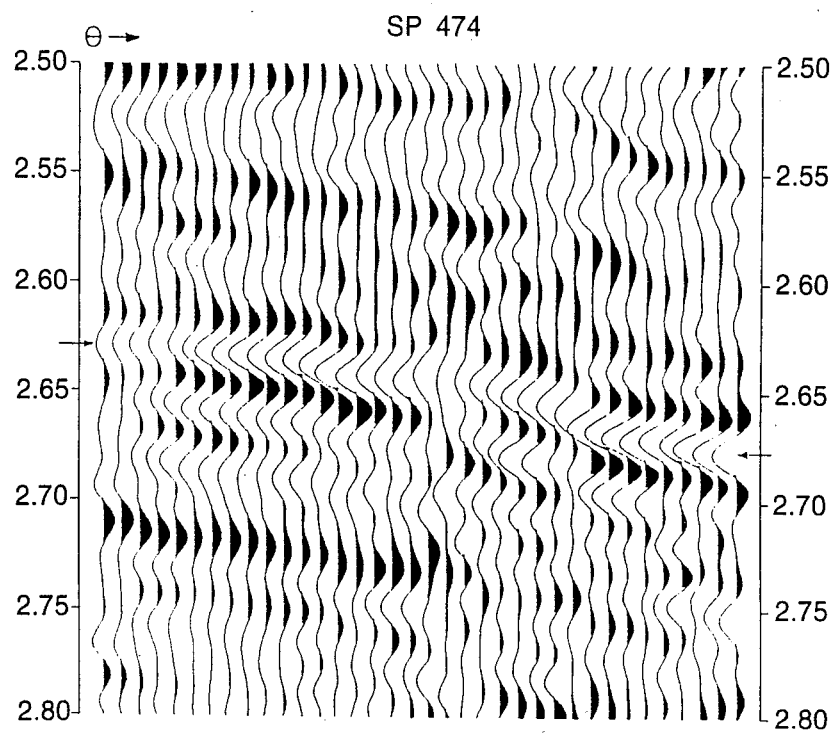
FIG. 9 is an unstacked CDP gather of offset seismic signals or traces at SP 474 of FIG. 4.

The measure of amplitude of each offset seismic signal or trace at the offset primary event position is calculated as the average amplitude for each offset seismic signal or trace 31-37 within $\pm\frac{1}{2}$ of the lobe width $L_w$ of the offset primary event position for each offset seismic signal or trace 31-37. Moreover, only lobe amplitudes of the offset seismic signals or traces 31-37 with the same sign as the product of the lobe amplitude of the reference seismic signal or trace 30 and the cross correlation peak are included in this average. The cross hatched portions of the lobes of offset seismic signals or traces 31-37 shown in FIG. 8 meet the criteria set for inclusion. The measure of seismic signal amplitude at the offset primary event position can also be either the peak, the value of the seismic signal envelope, or an average value of the seismic signal envelope as previously discussed.

Offset seismic signal or trace lobe amplitudes equal to zero are not included in the least squares fit of Equation (3). In cases where less than an adequate number of the offset signal or trace have nonzero lobe amplitudes, the least squares fit to Equation (3) is not attempted. In the preferred embodiment, at least one-half the offset seismic signal or trace lobe amplitudes are non-zero before a least squares fit to Equation (3) is attempted.

To facilitate association of the offset primary event position with the incident angle of an offset seismic signal or trace, an analytic velocity relation is used from which incident angles can be calculated as a function of time and range:

$$V(z) = V_0(1 + Kz)^{1/n} \quad (4)$$

The parameters ($V_0$, K, n) are specified by the user while z is vertical distance.

Equation (4) avoids the need for a time consuming ray tracing procedure, although ray tracing is a viable alternative. The parameters governing the analytical velocity function ($V_0$, K, n) are specified by the user based on previous fitting to observed stacking velocity functions. One analytical velocity function can be used for the entire set of seismic data or the velocity function can be varied with position. The calculation of the incident angle associated with a time offset position of an offset seismic signal or trace is somewhat adaptive, however, in that the local slope of the observed seismic event moveout is used to estimate the ray parameter $p(x,t)$ in the expression:

$$i = \arcsin(V(t)p(x,T_x)) \quad (5)$$

where i equals the incident angle at time t and position x; x equals the source-receiver offset; $T_x$ equals the normal incident two way travel time and:

$$V(t) = V_0\left(1 + \left(\frac{n-1}{n}\right)KV_0\frac{t}{2}\right)^{1/(n-1)} \quad (6)$$

and $$p(x,T_x) = \frac{dx}{dt} \approx (x_2 - x_1)/(T_{x2} - T_{x1}) \quad (7)$$

and $$T_x = \left(t^2 + \left(\frac{x}{V_{st}(t)}\right)^2\right)^{\frac{1}{2}} \quad (8)$$

where $V_{st}(t)$ is the observed stacking velocity function and $T_x$ is the observed two way event time. Analytical velocity functions other than those previously described may be substituted as required for fitting the observed data.

EXAMPLE 2

Figure 10:
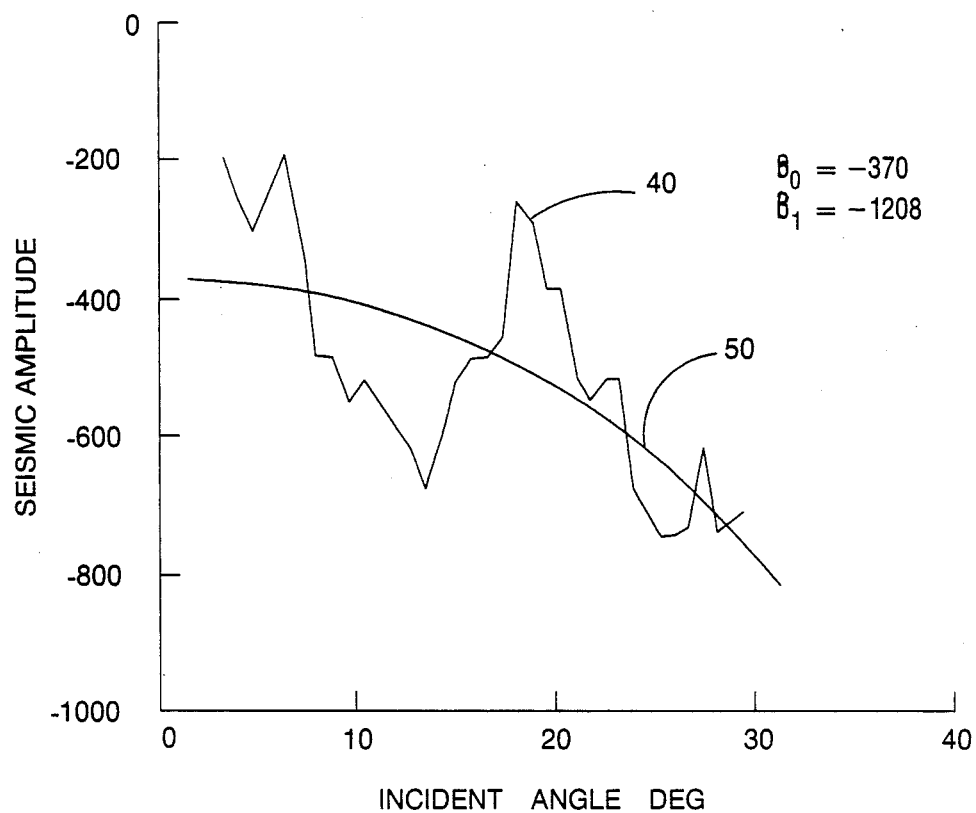
FIG. 10 is a plot of the variations of the offset seismic signal or trace amplitude as a function of incident angle and a least squares fit thereto for the selected seismic event of FIG. 9.

By way of further example, the changing character of the seismic event at approximately 2.6 seconds of FIG. 4 is shown in FIGS. 9, 10, 11, and 12. Looking first to FIG. 9, an unstacked CDP gather of offset seismic signals or traces at SP 474 is shown for the seismic event at 2.6 seconds. FIG. 10 includes curve 40 with measured values of each offset seismic signal or trace amplitude at the offset primary event position plotted, as a function of the incident angle and a least squares fit thereto with Equation (3) in curve 50. The values obtained for the attributes $B_0$ and $B_1$ are also shown thereon. Since the maximum incident angle $\theta$ is 32°, the attribute $B_2$ can be disregarded.

Figure 11:
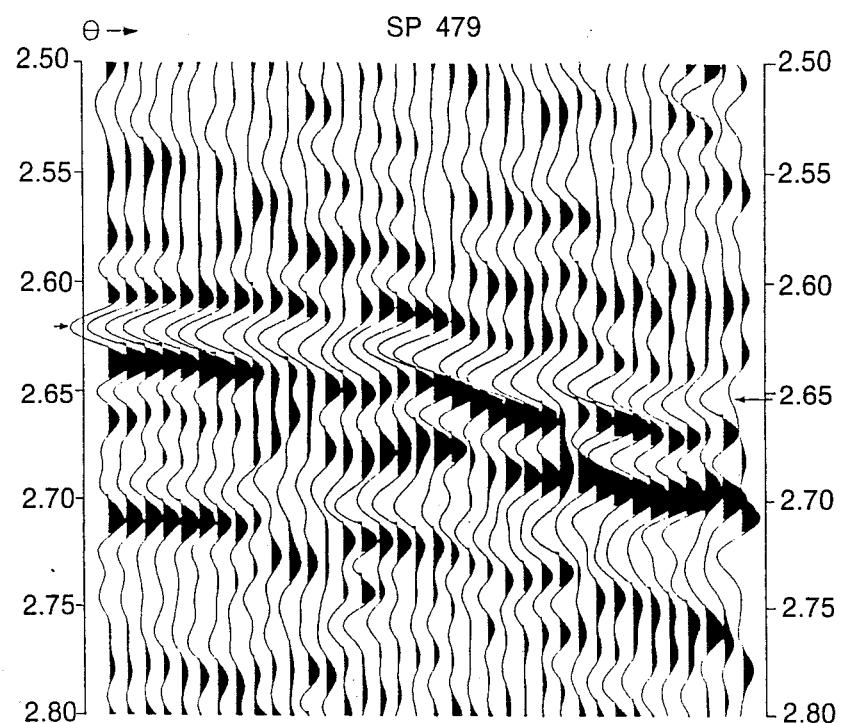
FIG. 11 is an unstacked CDP gather of offset seismic signals or traces at SP 479 of FIG. 4.
Figure 12:
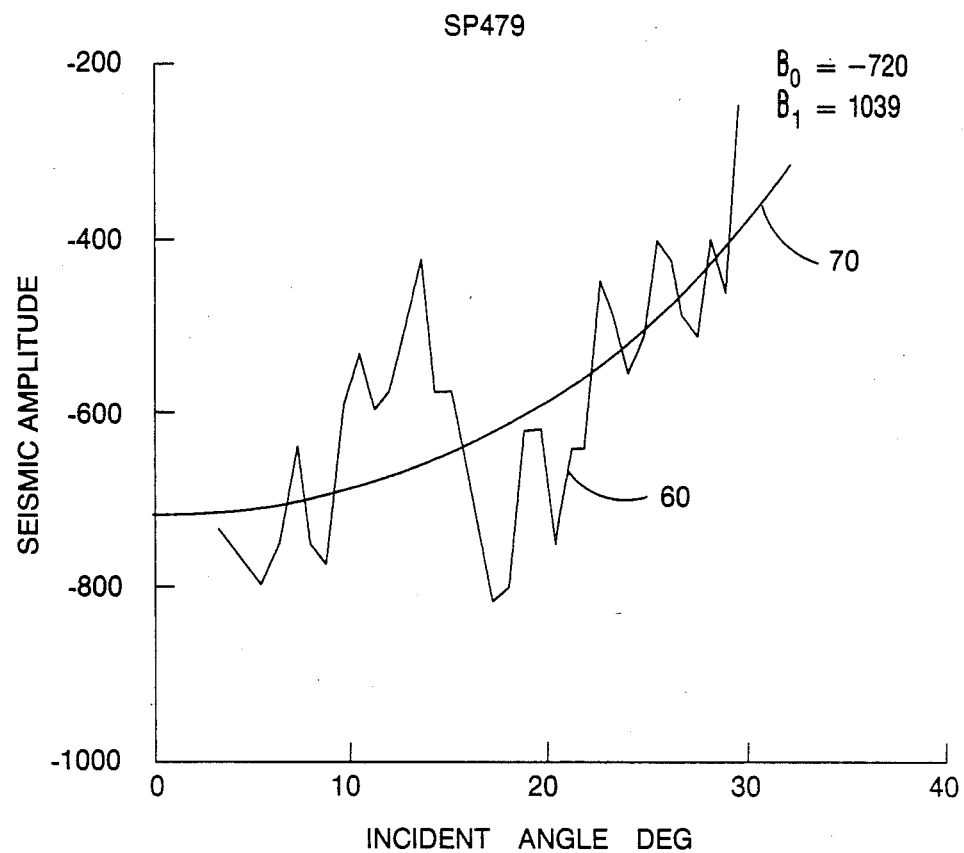
FIG. 12 is a plot of the variations of the offset seismic signal or trace amplitudes as a function of incident angle and a least squares fit thereto for the selected seismic event of FIG. 11.

Looking now at FIG. 11, an unstacked CDP gather of offset seismic signals or traces at SP 479 for the seismic event at 2.6 seconds is shown. FIG. 12 includes a curve 60 of the measured values of each offset seismic signal or trace amplitudes at the offset primary event position plotted, as a function of incident angle, and a least squares fit thereto with Equation (3) in curve 70. The values obtained for the attributes $B_0$ and $B_1$ are also shown thereon. Since the maximum incident angle $\theta$ is 32°, the attribute $B_2$ can be disregarded.

It can now be seen that the seismic event at approximately 2.6 seconds of FIG. 4 has clearly changed in character as it has progressed across the seismic section as indicated by the changes in the values of the attributes $B_0$ and $B_1$. This is so even though the seismic event has visually shown a consistently large negative seismic signal or trace amplitude in FIG. 4. It is this change in incident-angle dependent character of the amplitude of the seismic signal or trace across the seismic section of FIG. 4 which can provide the geophysicist with a diagnostic tool for quantitatively distinguishing among seismic events and for inferring changes in the geological character of the subterranean formation.

To this point, the first set of attributes (i.e., $B_0$, $B_1$ and $B_2$) quantitatively descriptive of variations in the seismic signal or trace amplitude as a function of incident angle has been described. A second set of attributes $B_F$ further descriptive of such seismic signal or trace amplitude variations as a function of incident angle can be developed where $B_F$ is generally a function of ($B_0$, $B_1$ and $B_2$) including but not limited to:

$$B_s = (\text{sign } B_0) \cdot (\text{sign } B_1)$$

$$B_z = (\text{sign } B_0) \cdot B_1$$

$$B_L = \arctan (B_1/B_0)$$

$$B_r = B_1/B_0$$

Sign, as used herein, is intended to indicate the ± sense of $B_0$ or $B_1$.

Consider now the physical interpretation of the first and second sets of attributes:

$B_0$ describes the normal incidence response and can be used to tie well log data to seismic sections. $B_0$ can differ significantly from the stacked seismic signal or trace amplitudes. $B_0$ provides a measure of the change in density and compressional wave velocity between adjacent formations.

$B_1$ provides a measure of the offset event amplitude rate of change with offset or slope of the seismic signal or trace amplitude with offset. This can be an indicator of hydrocarbons or porosity development.

$B_2$ provides a measure of the far range variation in seismic signal or trace amplitudes of the seismic event and can be usually disregarded for incident angles of approximately no more than 35°.

$B_s$ provides an indication of when the amplitude of the seismic event is increasing or decreasing with offset. Such an indication can be useful for the empirical relation when the seismic signal or trace amplitude increases with offset and is associated with gas-bearing formations. The polarity of the seismic signal or trace can be improperly reversed without affecting $B_s$.

$B_z$ is similar to $B_s$ except that variations in the magnitude of the slope or rate of change of the seismic signal or trace amplitude with offset are retained. Retaining this information is useful for judging coherence and reliability of the measurement and evaluating subtle changes that can be related to lithology and pore fluid content of the subterranean formation.

$B_L$ and $B_r$ provide a measure of seismic signal or trace amplitude variations with offset normalized by the value of $B_0$.

DISPLAY OF ATTRIBUTES

Each of the first and second sets of attributes can be also displayed by overlaying values of the attributes on the corresponding CDP stacked seismic signals in one of three modes. First, a lobe mode which provides a square wave output coinciding to the stacked seismic signal or trace lobes bounded by its zero crossings. Second, a seismic mode output where each attribute is modulated by the stacked seismic signal wiggles. And, third, a response mode where each attribute value is picked at the peaks of the stacked seismic signal envelope lobes and set as a constant from envelope trough to trough. The envelope of the seismic signal comprises the lobe frequency curves encompassing or bounding the fractions of higher frequency. See generally, "Encyclopedic Dictionary of Exploration Geophysics," by R. E. Sheriff, publisher is S Society of Exploration Geophysics (Tulsa, Okla., 1974), P. 73. Additionally, the first and second set of attributes can be displayed in color-vector plots by assigning a primary color to each attribute the intensity of each color is a function of the magnitude of the selected attribute and thereafter, by color compositing, highlight subtle changes in the amplitude of the signal or trace as well as indicate the presence or absence of various combinations of the attributes. The intensity of the selected colors can be controlled to correspond to ranges of values for each attribute to further indicate the differences between adjacent formations.

PROCESSING

Figure 13:
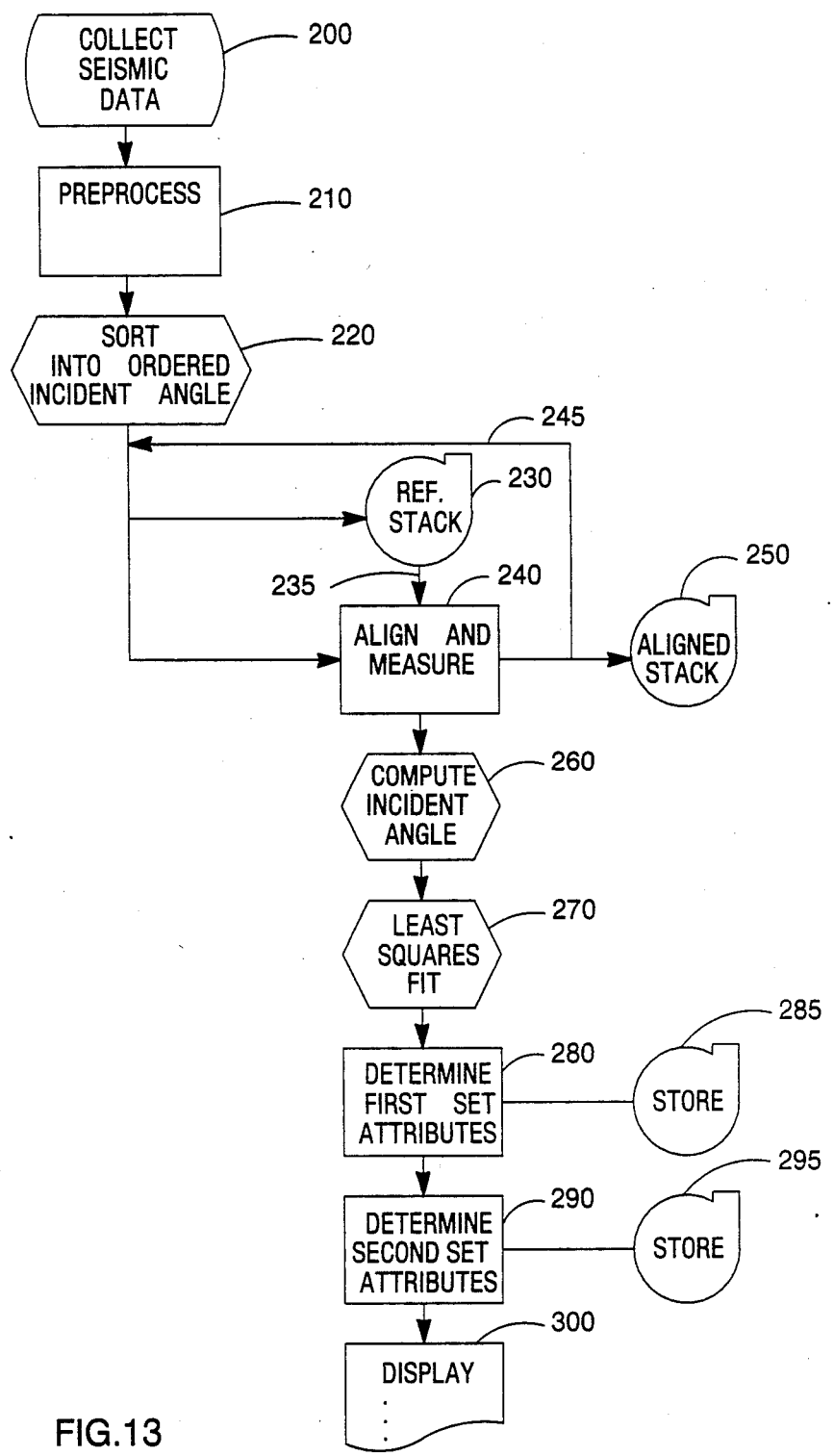
FIG. 13 is a schematic flow diagram of the method of the present invention for processing seismic data.
Figure 14:
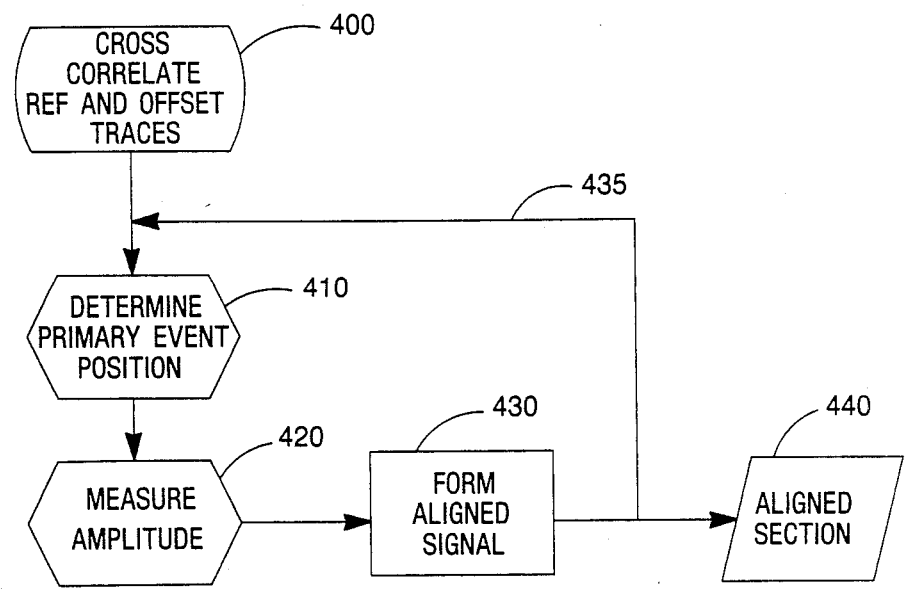
FIG. 14 is a schematic flow diagram for aligning and obtaining a measure of the offset seismic signal or trace amplitude for selected seismic events.

FIGS. 13 and 14 are schematic flow diagrams show the processing steps for first aligning and measuring the selected seismic events amplitudes and thereafter obtaining a least squares fit of such seismic data to Equation (3) including obtaining first and second sets of attributes.

Looking first to FIG. 13, seismic data is obtained including a plurality of seismic signals or traces generated from sets of seismic receivers and seismic sources in Block 200. Although the focus of this discussion is for high intensity seismic events, it is understood the process of the present invention can operate over the entire extent of the seismic signal or trace to evaluate all seismic events thereon. The seismic signals or traces are preprocessed in Block 210 to enhance true variations of the seismic signal or trace amplitude as a function of incident angle. Proceeding to Block 220, the seismic signals or traces are sorted into ordered incident angles and preferably into unstacked CDP gathers of offset seismic signals or traces. At Block 230 the offset seismic signals or traces are CDP stacked to produce a reference seismic section comprising a plurality of CDP stacked seismic signals or traces designated reference seismic signals which are communicated to Block 240 by line 235 from which a geophysicist identifies selected seismic events which are to be aligned and measured on the offset seismic signals or traces. As a result of aligning and measuring the seismic signal or trace amplitude for the selected seismic event, the geophysicist can proceed to produce an aligned CDP stacked seismic section in Block 250. However, by following feedback loop 245, it is possible through iterative processing to refine the aligning and measuring of the amplitude of the offset seismic signals or traces so as to increase the resolution of the aligned CDP stacked seismic sections.

After several iterations of aligning and measuring, an aligned CDP seismic section is produced in Block 250. The seismic event selected from reference seismic signal or trace is then processed to determine its incident angle with the formation associated with the selected seismic event in accordance with Equations (4) to (8) in Block 260. The primary offset position for each offset seismic signal or trace is thus associated with a particular angle of incidence. The measured amplitude of each offset seismic signal or trace of the unstacked CDP gather of seismic signals is processed to obtain an optimized statistical fit to the Equation (3) using the least squares technique in Block 270. By obtaining a least squares fit to Equation (3), a first set of attributes (including $B_0$, $B_1$ and $B_2$) are developed in Block 280. The first set of attributes ($B_0$, $B_1$ and $B_2$) are then sent to a memory storage in Block 285 which can later be displayed in one of three modes, i.e., square wave, modulated, or response. From the first set of attributes, a second set of attributes $B_F$ (including $B_z$, $B_s$, $B_L$, and $B_r$) are obtained in Block 280. The second set of attributes are stored in memory storage in Block 295 which can later be displayed in one of three modes, i.e., square wave, modulated, or response.

It should be further noted that each attribute in the first and second sets of attributes can also be assigned a unique color in Blocks 280 or 290 so that by color compositing a color-vector plot can be obtained which can highlight the subtle variations in amplitude of a seismic signal or trace so as to distinguish among seismic events those which can be an indicator of the presence of a gas-bearing formation or change in the formation geology. In Block 300, the operator can select from the first and/or second set of attributes stored in Blocks 285 andd/or 295 and display them in one of three modes on the aligned CDP seismic sections produced in Block 250. With color-vector displays, those formations which are associated with gas-bearing strata can be immediately identified by the appearance or absence of certain colors associated with various combinations of the attributes.

Looking now to FIG. 14, the process of aligning and measuring the amplitude of each offset seismic signal or traces in a CDP gather for the selected seismic events in Block 240 of FIG. 13 is further described. In Block 400, a time segment of a reference CDP seismic signal or trace produced in Block 230 of FIG. 13 is cross correlated with time segments of each offset seismic signals or traces in a CDP gather are cross correlated. Looking next to Block 410, the primary offset event position is determined from the peaks in the cross correlation. In Block 420, a measure of the average lobe amplitude for each offset seismic signal or trace is obtained for each primary offset seismic position. In Block 430, an aligned CDP stacked seismic signal or trace is produced by stacking the aligned and measured seismic events of the offset seismic signals or traces. An aligned CDP seismic section can be obtained in Block 440 or by following feedback line 435 by iterative processing refinements in the alignment of seismic events in the unstacked CDP gathers of offset seismic signals or traces. Once the geophysicist is satisfied that the CDP gathers have been adequately aligned for each amplitude peak associated with an offset seismic signal or trace, an incident angle can be calculated and associated with each offset seismic signal or trace in Block 260 of FIG. 13. Thereafter, a set of measured amplitudes and associated incident angle are available for further processing to obtain a least squares fit to Equation (3) as shown in Block 270 of FIG. 13.

EXAMPLE 3

Figure 15:
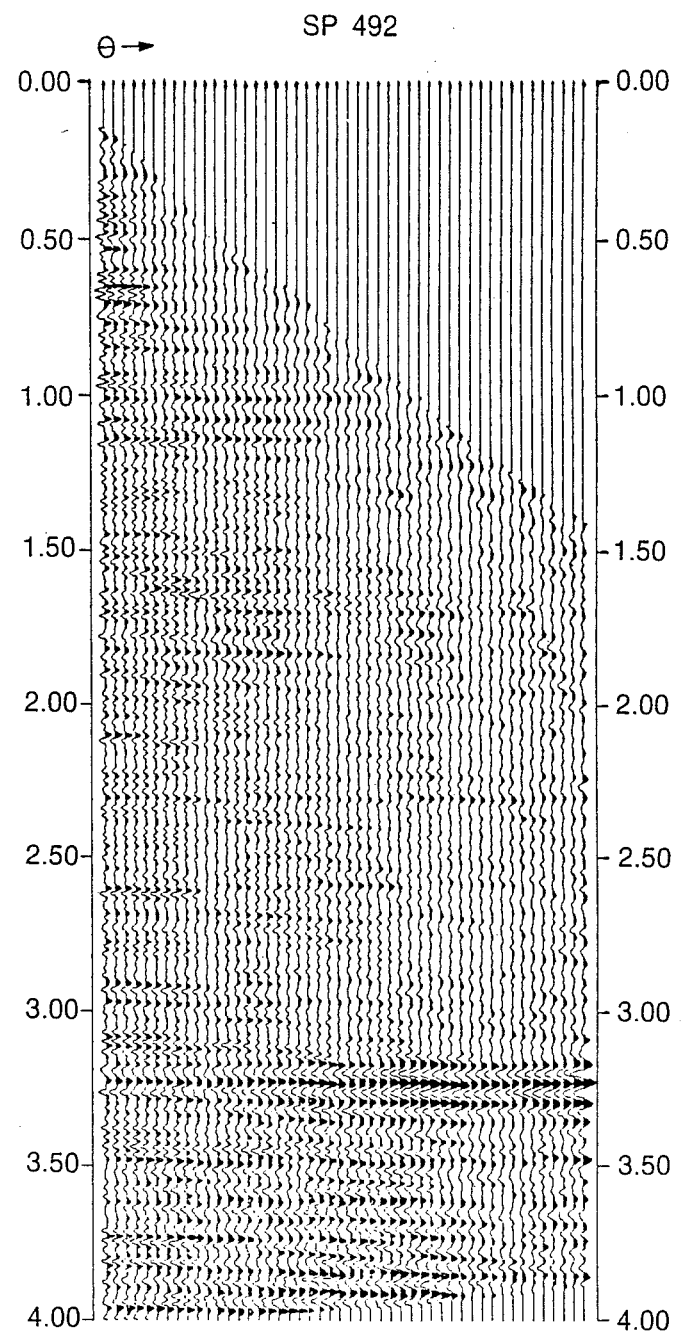
FIG. 15 is an unstacked CDP gather of seismic signals or traces.
Figure 16:
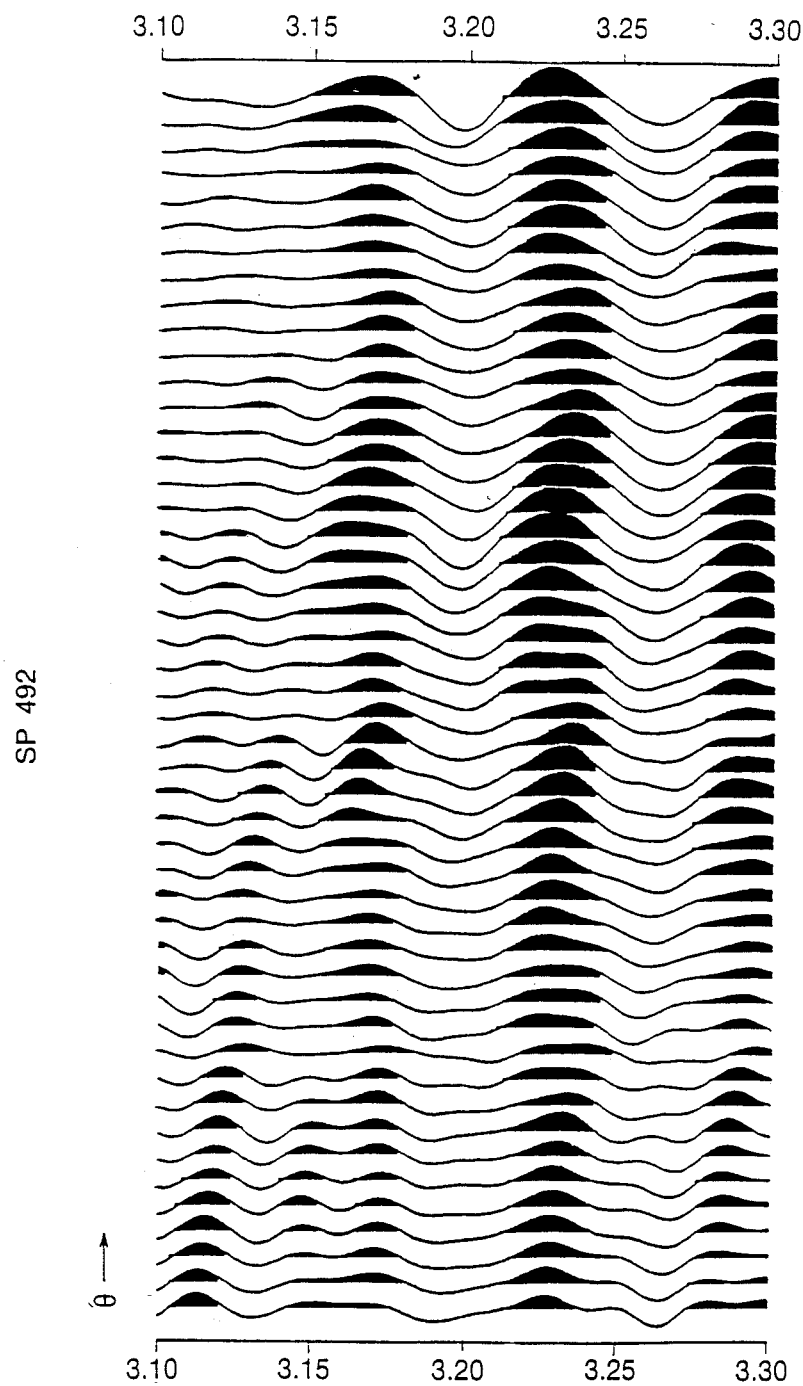
FIG. 16 is an unstacked CDP gather of offset seismic signals or traces at SP 492 of FIG. 15.

In order to demonstrate the efficacy of the alignment and measurement technique previously described, the following example is provided. FIG. 15 is an unstacked CDP gather of field data containing seismic events of interest at approximately 3.2 secs. FIG. 16 is an unstacked CDP gather of offset seismic signals or traces at SP 492 of FIG. 15 more clearly demonstrating the seismic events as well as the incident angle-dependent amplitude variations.

Figure 17:
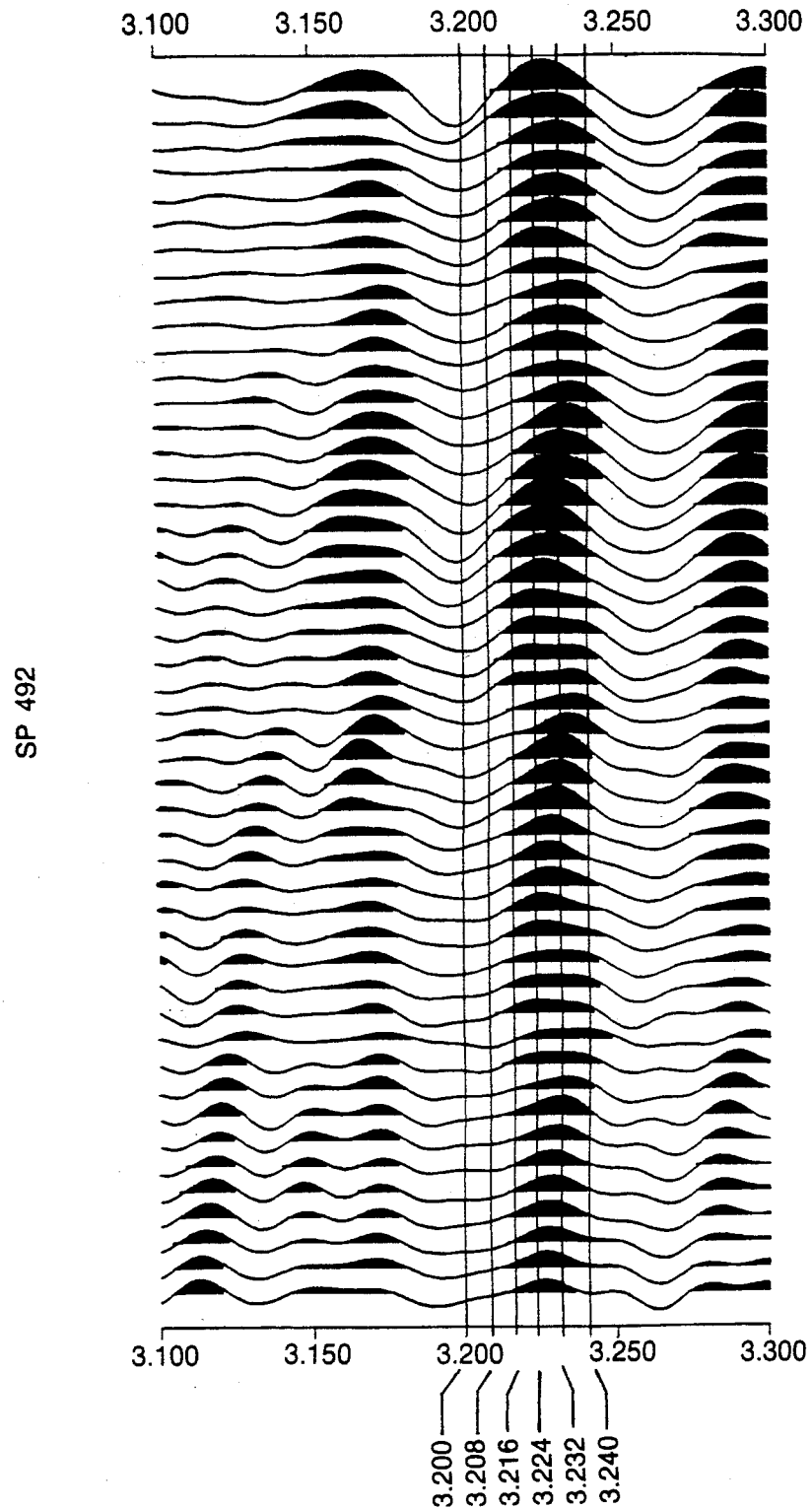
FIG. 17 is a time-expanded section of FIG. 16 with uniformly spaced time slices.

Recall that the first step in alignment and measurement technique of the present invention is to select a seismic event lobe of interest on a a CDP stacked seismic signal or trace, i.e., the reference seismic signal or trace. FIG. 17 is a time expanded version of FIG. 16 in which six uniformly spaced time slices have been indicated, i.e., 3.2, 3.208, 3.216, 3.224, 3.232 and 3.240 secs. The amplitude of each offset seismic signal or trace is obtained along the various time slices and plotted in FIG. 18 as a function of incident angle.

The wide variations in the seismic signal or trace amplitude as a function of incident angle are noted and as such are exemplary of the difficulties confronted in obtaining an accurate measure of such variations.

Figure 18:
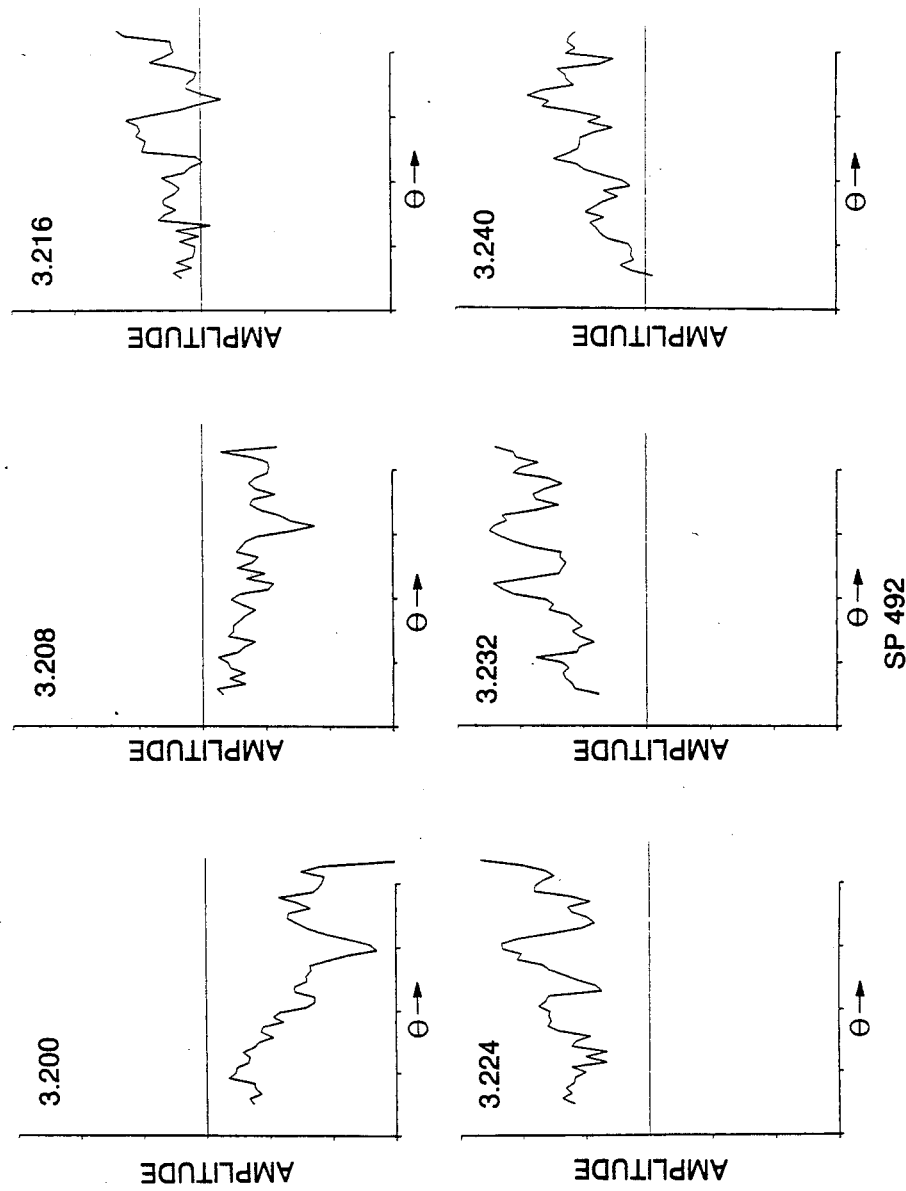
FIG. 18 is a plot of the variation of the offset seismic signal or trace amplitudes as a function of incident angle for the uniform time slices shown in FIG. 17.
Figure 19:
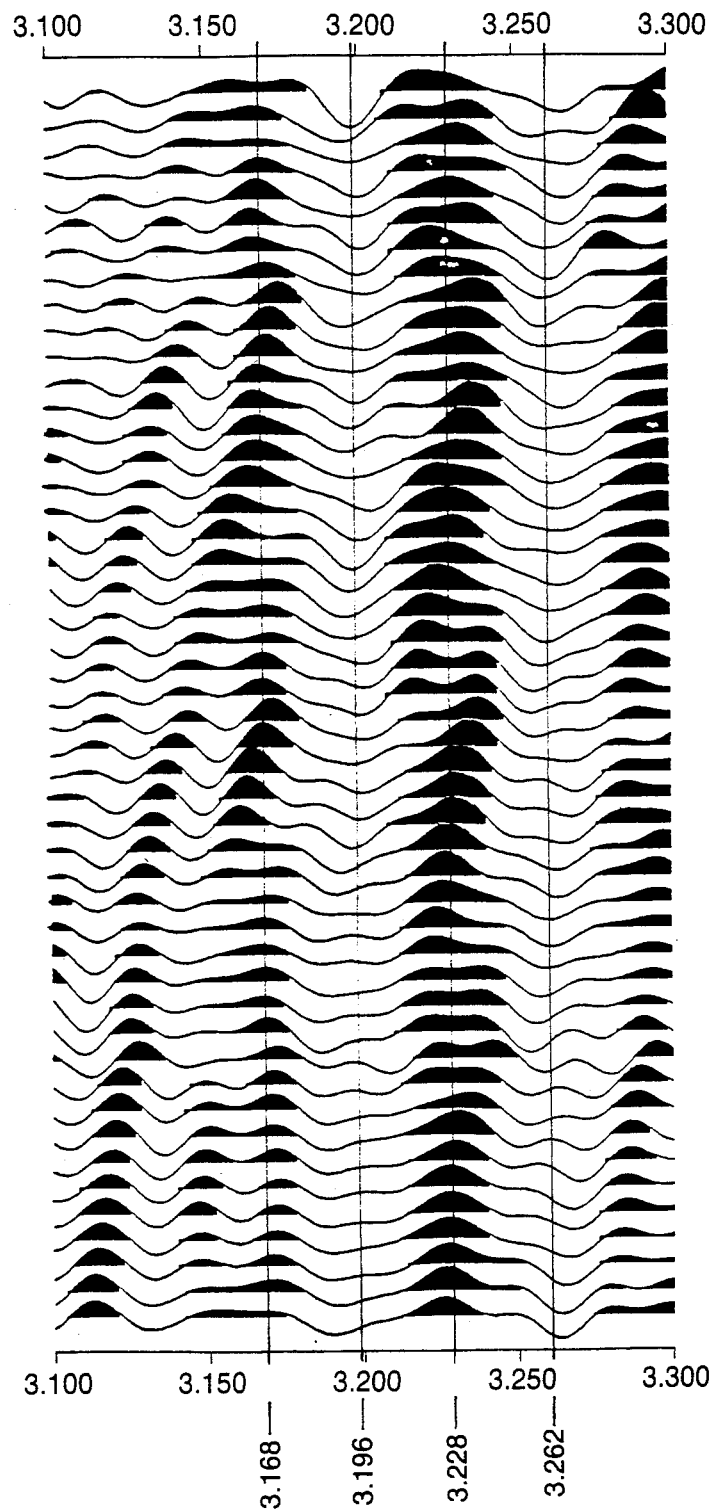
FIG. 19 is a time-expanded section of FIG. 16 with time slices selected according to the present invention.

Now looking at FIG. 19, the same time-expanded portion of FIGS. 16 and 18 is shown; however, the time lines thereon correspond to those selected according to the alignment and measurement technique of the present invention. That is, the time lines for aligning and measuring correspond to the lobe peak of the reference seismic signal or trace.

Figure 20:
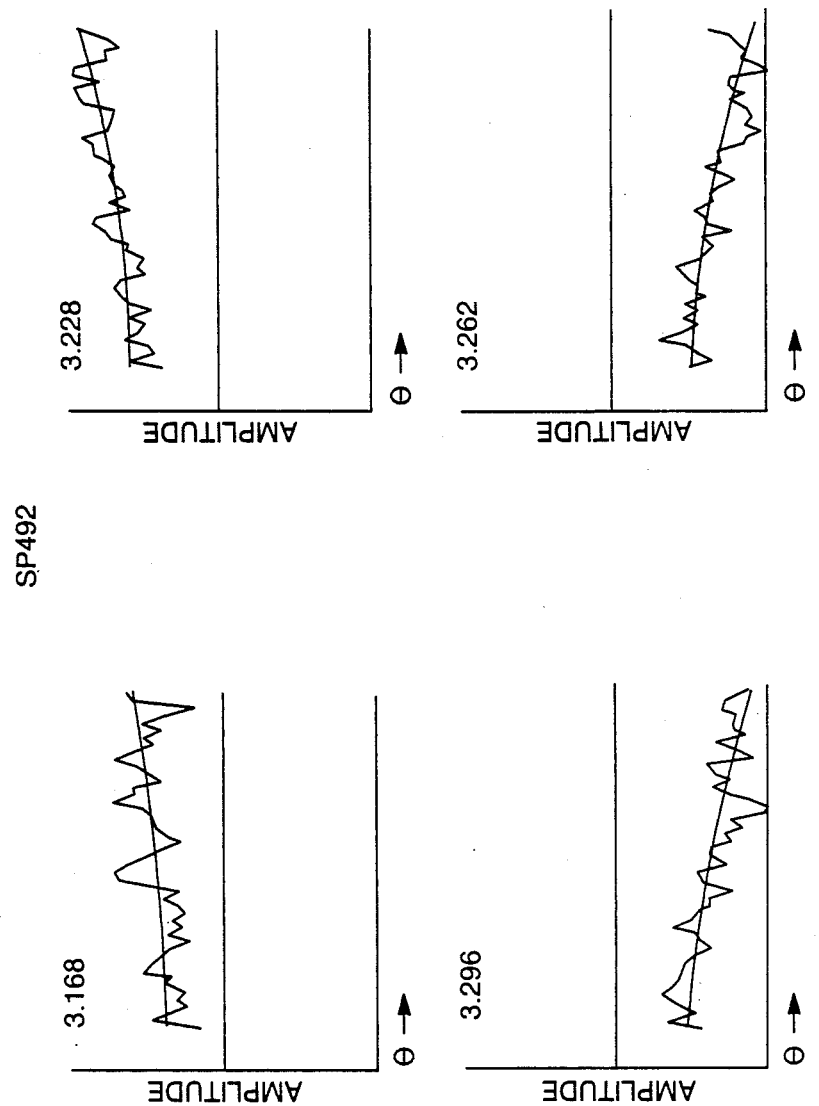
FIG. 20 is a plot of the variation of the offset seismic signal or trace amplitudes as a function of incident angle for the time slices shown in FIG. 19 and a least squares fit thereto.

FIG. 20 includes a plot of the measured offset seismic signal or trace amplitude as a function of incident angle for the four time lines, i.e., 3.168, 3.228, 3.262 and 3.296 secs. The scatter in the offset seismic signal or trace amplitude as a function of incident angle are now considerably reduced from those of FIG. 18. Having reduced the scatter in the data by the alignment and measurement techniques of the present invention, a better statistical fit to Equation (3) can be obtained resulting in a more accurate quantification of the sets of attributes. The least squares fit to Equation (3) is also plotted in FIG. 20 and is indicated by the smooth curved lines.

Thus, the efficacy of the alignment and measurement technique of the present invention is to more accurately portray the sets of attributes for use as a diagnostic tool for inferring changes in the geological character of the subterranean formation.

Additionally, it is noted that the seismic events at the 3.168 and 3.228 sec time slices are both described by the same set of attributes, i.e., $B_o$ is positive and $B_1$ is positive. While the seismic events at 3.296 and 3.262 sec time slices are both described by the same set of attributes, i.e., $B_o$ is negative and $B_1$ is negative.

However, the attribute $B_s$ for both cases is positive. Because of the possibility of reverse polarity in the seismic signal or trace, the attribute $B_s$ treats both examples of FIG. 20 as identical and in fact all four time slices have been correlated with gas-bearing formations.

Therefore, it is clear that not only can the sets of attributes quantitatively distinguish among seismic events and thus infer changes in the geological character of the subterranean formation, but that sets of attributes can also be effectively employed as a a predictor of gas-bearing formations.

Hence, it can be seen that the present invention discloses a quantitative tool for quickly identifying subtle changes in the subterranean formations. The present invention provides the geophysicist's wit a diagnostic tool for inferring changes in the geological character of the subterranean formations associated with selected seismic events. Having disclosed the fundamental concept of the present invention, it will be obvious to those skilled in the art, the variations or modifications thereto can be obtained without departing from the spirit of the invention.

What we claim is:

1. A method of seismic exploration including processing a plurality of seismic signals to quantitatively distinguish among seismic events, comprising the steps of:
   obtaining an incident angle ordered gather of seismic signals;
   obtaining a measure of the reflection coefficient as a function of incident angle for selected seismic events within the incident angle ordered gather of seismic signals; and
   developing sets of attributes descriptive of variations in the amplitude of the seismic signal as a function of incident angle from the reflection coefficient to quantitatively distinguish among seismic events.

2. The method of claim 1 further including the step of:
   overlaying selected attributes of the sets of attributes onto a corresponding seismic section of the seismic signals.

3. The method of claim 1 wherein the sets of attributes includes:
   a first set of attributes for inferring changes in formations properties including $$B_0 = \frac{\Delta Z}{2Z}$$

and $$B_1 = \frac{\Delta \alpha}{2\alpha} - \frac{2\beta^2}{\alpha^2} \frac{\Delta \mu}{\mu}$$

where
   $Z$ is the average compressional impedance of adjacent formations;
   $\alpha$ is the average compressional wave velocity of adjacent formations;
   $\beta$ is the average shear wave velocity of adjacent formations;
   $\mu$ is the average shear modulus of adjacent formations; and
   $\Delta$ indicates a change in a given property.

4. The method of claim 3 wherein the first set of attributes for inferring changes in formation properties further includes:

$$B_2 = \frac{2\beta^2 \Delta \mu}{\alpha^2 \mu}$$

5. The method of claim 3 further including the step of:
   developing a second set of attributes which provide a measure of the variations in the amplitude of the seismic signal as a function of incident angle and are functions of the first set of attributes.

6. The method of claim 5 further including the step of:
   assigning a selected color to each attribute of the first and second set of attributes, the intensity of each color being a function of the magnitude of the selected attribute; and
   overlaying selected colored attributes of the sets of attributes onto a corresponding seismic section of seismic signals.

7. The method of claim 5 wherein the second set of attributes includes a measure of change in magnitude of the amplified for each selected seismic event as a function of range.

8. The method of claim 7 wherein said change in magnitude of the amplitude as a function of range is described by:

$$B_s = \text{sign}(B_0) * \text{sign}(B_1)$$

where sign indicates the $\pm$ sense of $B_0$ and $B_1$.

9. The method of claim 5 wherein an attribute of the second set of attributes is described by:

$$B_L = \arctan(B_1/B_0).$$

10. The method of claim 5 wherein an attribute of the second set of attributes is described by:

$$B_r = B_1/B_0.$$

11. The method of claim 1 wherein the sets of attributes includes a measure of the normal incidence reflection coefficient for each selected seismic event.

12. The method of claim 11 wherein the measure of the normal incidence reflection coefficient is described by the attribute $B_0$ where $$B_0 = \Delta Z/2Z,$$

$Z$ is the average compressional impedance, and
$\Delta Z$ is a change in the compressional impedance.

13. The method of claim 1 wherein the set of attributes includes a measure of rate of variation of the seismic signal amplitude as a function of incident angle for each selected seismic event.

14. The method of claim 13 wherein:
   the rate of variation of the seismic signal amplitude is described by the attribute $B_1$: where $$B_1 = \frac{\Delta \alpha}{2\alpha} - \frac{2\beta^2}{\alpha^2} \frac{\Delta \mu}{\mu},$$

$\alpha$ is the average compressional wave velocity of adjacent formations;
   $\beta$ is the average shear wave velocity of adjacent formations;
   $\mu$ is the average shear modulus of adjacent formations; and
   $\Delta$ indicates a change in a given property.

15. The method of claim 1 wherein the sets of attributes includes:
   a measure of the normal incidence reflection coefficient for each selected seismic event; and
   a rate of variation of the seismic signal amplitude as a function of incident angle.

16. The method of claim 1 wherein the step of obtaining a measure of the reflection coefficient includes the steps of:
   obtaining a measure of the amplitude for the selected seismic event of each offset seismic signal in an incident angle ordered gather of offset seismic signal; and
   statistically fitting the measure of amplitude of each offset seismic signal according to:

$$R_c(\theta) = B_0 + B_1 \tan^2 \theta + B_2 \tan^2 \theta \sin^2 \theta \quad (9)$$

where $B_0$, $B_1$ and $B_2$ are attributes; and $\theta$ is an incident angle for the selected seismic event on each of said seismic signal.

17. The method of claim 16 wherein the maximum incident angle $\theta$ is approximately 35°.

18. The method of claim 17 wherein the step of obtaining a measure of the reflection coefficient includes the step of statistically fitting the measure of amplitude according to:

$$R_c(\theta) = B_0 + B_1 \tan^2 \theta.$$

19. A method for aligning and obtaining a measure of seismic signal amplitude of seismic signals as a function of incident angle for selected seismic events comprising the steps of:

sorting offset seismic signals into gathers of ordered incident angle;

forming a reference seismic signal from the incident angle gather of offset seismic signals;

cross-correlating a segment of the reference seismic signal containing the selected seismic event with a segment of the corresponding gather of offset seismic signals, the position of maximum cross-correlation on each offset seismic signal being a primary offset event position;

averaging the lobe amplitude of each offset seismic signal within a prescribed time window of the offset primary event position; and forming ordered pairs of averaged lobe amplitudes and corresponding primary offset positions.

20. The method of claim 19 wherein the step averaging further includes:

averaging only lobe amplitudes having the same sign as the product of the reference signal lobe amplitude and the cross correlation function.

21. The method of claim 19 further including:

obtaining a measure of the incident angle for the selected seismic event at each offset primary event position.

22. A method of displaying seismic data to quantitatively distinguish seismic events and to infer changes in the geology of the subterranean formations comprising the steps of:

obtaining sets of attributes descriptive of variations in seismic signal amplitude as a function of incident angle for selected seismic events in an incident angle ordered gather of seismic signals; and overlaying selected attributes descriptive of amplitude variations for selected seismic events in incident angle ordered gathers of seismic signals from the sets of attributes descriptive of variations in seismic signal amplitude in incident angle ordered gathers of seismic signals on corresponding seismic sections of the seismic data to quantitatively distinguish seismic events and to infer changes in the geology of the subterranean formations.

23. The method of claim 22 wherein the sets of attributes includes:

a first set of attributes $B_0$, $B_1$ and $B_2$ obtained from a least squares fit of the amplitude variations as a function of incident angle according to $$R_c(\theta) = B_0 + B_1 \tan^2 \theta + B_2 \tan^2 \theta \sin^2 \theta$$

where $R_c(\theta)$ is the reflection coefficient of the selected seismic event; and $\theta$ is an incident angle for the selected seismic event on an offset seismic signal.

24. The method of claim 23 wherein the sets of attributes includes:

a second set of attributes $B_F$ obtained from selected functions of the first set of attributes.

25. The method of claim 24 wherein the second set of attributes includes:

$B_s = \text{sign}(B_0) * \text{sign}(B_1);$ $B_r = B_1/B_0;$ and $B_L = \text{arctangent}(B_1/B_0);$ where sign indicates $\pm$ sets of $B_0$ and $B_1$.

26. The method of claim 22 further including:

assigning a selected color to each attribute in the sets of attributes.

27. The method of claim 26 further including:

varying the intensity of the color assigned to each attribute as a function of the magnitude of each attribute.

28. A method of seismic exploration to quantitatively distinguish seismic events, comprising the steps of:

(a) obtaining an incident angle ordered gather of seismic signals;

(b) determining a measure of seismic signal amplitude as a function of incident angle for selected seismic events in the incident angle ordered gather of seismic signals at a position of maximum cross-correlation of each seismic signal of the gather with a reference seismic signal, the reference seismic signal being a stack of the incident angle ordered gather of seismic signals; and (c) performing a statistical fit of the measured amplitudes for selected seismic events to a function of incident angle to obtain a first set of attributes descriptive of variations in amplitude as a function of incident angle for the selected seismic events to quantitatively distinguish seismic events.

29. The method of claim 28 wherein step (c) comprises performing a statistical fit of the measured amplitude for the aligned selected seismic events to a measure of reflection coefficient as a function of incident angle.

30. The method of claim 29 wherein the measure of reflection coefficient as a function of incident angle includes:

$$R_c(\theta) = B_0 + B_1 \tan^2 \theta + B_2 \tan^2 \theta \sin^2 \theta$$

where $B_0$, $B_1$, and $B_2$ are attributes; and $\theta$ is an incident angle for the selected seismic event on each of said seismic signals.

31. The method of claim 28 wherein step (b) comprises:

(a) forming the reference seismic signal by stacking the incident angle gather of offset seismic signals;

(b) cross-correlating a segment of the reference seismic signals containing selected seismic events with a segment of the corresponding gather of offset seismic signals, the position of maximum cross-correlation on each offset seismic signal being a primary offset event position;

(c) averaging the lobe amplitude of each offset seismic signal within a prescribed time window of the offset primary event position; and (d) forming ordered pairs of averaged lobe amplitudes and corresponding primary offset positions.

* * * * *

UNITED STATES PATENT OFFICE
CERTIFICATE OF CORRECTION

PATENT NO. : 4,646,239

DATED : February 24, 1987

INVENTOR(S) : John H. Bodine, Jonathan Bork, Richard M. Alford, James H. Wright, Leon A. Thomsen It is certified that error appears in the above-identified patent and that said Letters Patent are hereby corrected as shown below:

Column 11, line 15, "Block 280" should read --Block 290--; line 29, "andd/or" should read --and/or--.

Claim 7, Column 14, line 6, "amplified" should read --amplitude--.

Column 10, line 9, "lobe" should read --low--; line 10, "fractions" should read --deflections--.

Column 12, line 31, "3.296" should read --3.196--; line 49, "3.296" should read --3.196--; line 61, delete one of the words "a"; line 66, "wit" should read --with--.

Figure 20, the time line "3.296" should read --3.196--.

Column 11, line 43, delete the words "are cross correlated".

Signed and Sealed this
Fifteenth Day of November, 1988

Attest:

DONALD J. QUIGG

Attesting Officer     Commissioner of Patents and Trademarks